US006546877B2

United States Patent
Sanzo

(10) Patent No.: US 6,546,877 B2
(45) Date of Patent: Apr. 15, 2003

(54) RAILWAY TRUCK FRAME MOUNTED LOAD WEIGH VALVE

(75) Inventor: Roger F. Sanzo, Columbus, OH (US)

(73) Assignee: Buckeye Steel Castings Company, Columbus, OH (US)

( * ) Notice: Subject to any disclaimer, the term of this patent is extended or adjusted under 35 U.S.C. 154(b) by 0 days.

(21) Appl. No.: 10/025,111

(22) Filed: Dec. 19, 2001

(65) Prior Publication Data

US 2002/0073879 A1 Jun. 20, 2002

Related U.S. Application Data

(60) Provisional application No. 60/257,012, filed on Dec. 20, 2000.

(51) Int. Cl.[7] .................................................. B61D 1/00
(52) U.S. Cl. ..................................... 105/157.1; 303/22.2
(58) Field of Search .............................. 105/157.1, 226; 303/22.5, 22.6, 22.2; 188/195, 198, 219.1

(56) References Cited

U.S. PATENT DOCUMENTS

| 1,426,075 A | * | 8/1922 | Hedgcock ................. 188/229.6 |
| 3,369,846 A | * | 2/1968 | Scott .......................... 303/22.6 |
| 3,376,080 A | * | 4/1968 | Kettering et al. .......... 303/22.6 |
| 3,425,752 A | * | 2/1969 | Pollinger et al. .......... 303/22.2 |
| 3,597,013 A | * | 8/1971 | Shah ........................... 303/22.6 |
| 3,612,621 A | * | 10/1971 | Scott .......................... 303/22.6 |
| 3,671,086 A | * | 6/1972 | Scott .......................... 303/22.2 |
| 3,945,689 A | * | 3/1976 | Masuda et al. ............. 303/22.1 |
| 4,235,478 A | * | 11/1980 | Billeter ....................... 303/22.2 |
| 4,583,790 A | * | 4/1986 | Scott .......................... 303/22.2 |
| 4,801,179 A | * | 1/1989 | Hintner ....................... 303/22.2 |
| 5,000,298 A | * | 3/1991 | Jackson et al. ........... 188/219.1 |
| 5,005,915 A | * | 4/1991 | Hart et al. .................. 303/22.2 |
| 5,100,207 A | * | 3/1992 | McKay ....................... 303/22.2 |
| 5,106,168 A | * | 4/1992 | McKay ....................... 303/22.2 |
| 5,259,485 A | * | 11/1993 | Jackson ....................... 188/198 |
| 5,269,595 A | * | 12/1993 | McKay et al. ............. 303/22.2 |
| 5,575,221 A | * | 11/1996 | Biegel et al. ............. 105/157.1 |

* cited by examiner

Primary Examiner—Mark T. Le
Assistant Examiner—Lars A. Olson
(74) Attorney, Agent, or Firm—Banner & Witcoff, Ltd.

(57) ABSTRACT

A load weigh valve assembly for a railway car is provided. The load weigh valve assembly is mounted to the truck frame on primary sprung trucks to enable actuation of the load weigh valve pivot arm. The load weigh valve assembly is also mounted to the truck frame so as to eliminate the problems associated with oscillating and sliding motion at the load weigh valve pivot arm. In addition, the undesirable valve actuation that occurs due to car roll is eliminated.

21 Claims, 7 Drawing Sheets

RAILWAY TRUCK FRAME MOUNTED LOAD WEIGH VALVE

This application claims priority to provisional U.S. Application Ser. No. 60/257,012 filed Dec. 20, 2000.

FIELD OF THE INVENTION

The present invention is directed generally to load weigh valves for railway cars, and more particularly, to load weigh valves that are mounted to the railway truck frame.

BACKGROUND OF THE INVENTION

The load weigh valve assembly is the component of the railway car that senses the load placed on the railcar body and communicates with the brake cylinders to adjust the wheel brake pressure accordingly. That is, as the car body is loaded and the springs of the suspension deflect, the load weigh valve senses this spring deflection and communicates with the brake cylinders to increase the brake pressure applied to the wheels. Likewise, as the load placed on the car body decreases, the load weigh valve communicates with the brake cylinders to decrease the amount of brake pressure applied to the wheels.

A load weigh valve is commonly used with certain types of cars, such as coal cars, boxcars, gondolas and high-speed express boxcars. It is used on these types of cars because the weight of these cars varies considerably from a lightweight, unloaded car to a much heavier loaded car and the required amount of brake pressure to be applied will vary depending on the loaded state of the car. Most load weigh valves have several pressure positions. For example, it is common for load weigh valves to have a no pressure position, a low pressure range, a changeover position and a high pressure range. The load weigh valve is in the no pressure position when the brakes are released. When the brakes are applied and the car weight is between the empty and 40% loaded condition, the valve is in the low pressure position. When the brakes are applied and the car weight is above the 40% loaded condition, the valve changes to the high pressure position. It should be apparent that the changeover position for the load weigh valve is approximately a 40% loaded condition. The low pressure position of the load weigh valve allows the brake system to apply less air pressure, and hence less brake shoe force to the wheels. Otherwise, in the light car condition (that is, less than a 40% loaded condition), without the use of a load weigh valve in a low pressure position, the full brake force would be applied to the wheels causing the wheels of the car to slide thereby creating flat spots on the tread of the wheels, a result that is undesirable.

Conventionally, the prior art load weigh valve was mounted to the railcar body and included a load weigh valve pivot arm that interfaced with the truck frame. A drawback with the conventional load weigh valve, and specifically the mounting of the load weigh valve to the car body, is that the car body is sprung relative to the truck frame. As a result, the load weigh valve, and in particular, the pivot arm of the load weigh valve, not only must sense the load placed on the railcar body, but also must compensate for spring deflection, truck swivel and car body roll. Also, the conventional mounting arrangement locates the load weigh valve on the underside of the car body floor, above the truck frame. This arrangement is difficult to inspect because the car body side sill obstructs most views of the valve. To view the valve, an inspector must position his head between the truck frame and the car body sill. Likewise, in the conventional arrangement, valve replacement or maintenance is very cumbersome and easy to overlook. Another drawback with the railcar body mounted load weigh valve is the device will not work with a primary sprung truck, such as a freight truck. On a primary sprung truck arrangement, the spring deflection occurs between the axles and the truck frame.

BRIEF SUMMARY OF THE INVENTION

The present invention overcomes the aforementioned problems known in the art by providing a load weigh valve arrangement that is mounted to the truck frame and not the railcar body. In an exemplary embodiment, the present invention includes a load weigh valve assembly mounted to the truck frame, the load weigh valve assembly including a load weigh valve connected to the truck frame, a weigh valve pivot arm operatively connected to the load weigh valve, and a load sensor arm interface bracket.

With the load weigh valve assembly mounted to the truck frame, the valve senses spring deflection between the sprung and unsprung elements of a primary sprung truck arrangement. Also, the oscillating and sliding motion at the load weigh valve pivot arm, which occurs with the standard freight truck during swivel, is eliminated. In an exemplary embodiment, with the load weigh valve mounted at or near the truck frame centerline, the undesirable valve actuation that occurs due to car body roll is eliminated. In addition, the location of the load weigh valve at or near the truck centerline minimizes the exposure of the load weigh valve to foreign matter and flying debris thrown up by the wheels during operation. Finally, the assembly of the present invention is a more rugged and reliable construction of the conventional load weigh valve assembly.

DETAILED DESCRIPTION OF THE INVENTION

Figure 1:
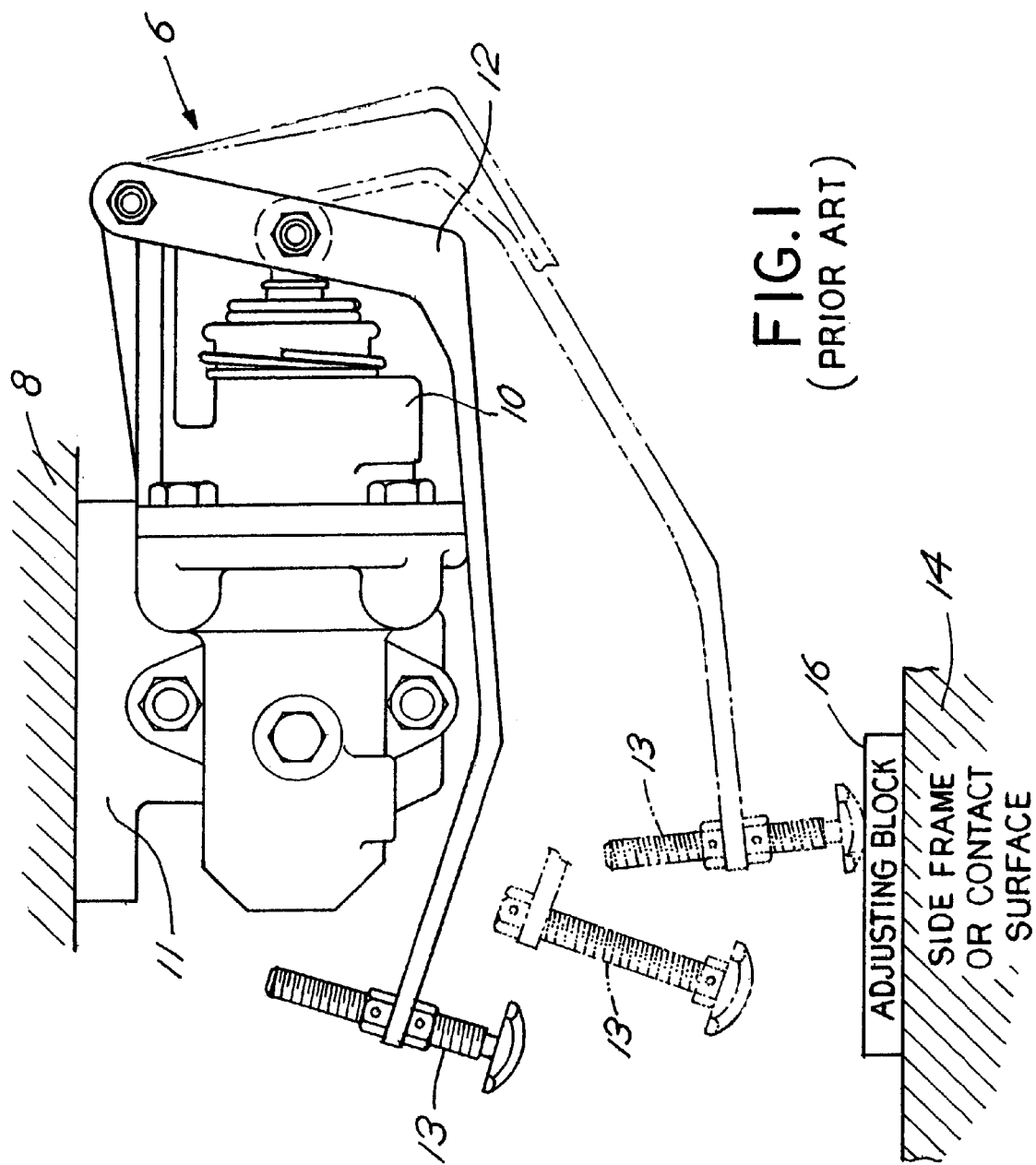
FIG. 1 shows a prior art load weigh valve mounted to a railcar body.

Referring to the Figures wherein like numerals indicate like elements, there is depicted in FIG. 1 a conventional load weigh valve assembly 6 mounted to a railway car body 8. As stated, the load weigh valve assembly senses the load placed on the car body and communicates with the brake cylinders, not shown. Depending on the weight of the railcar body, the load weigh valve assembly will communicate to the brake cylinders to either increase or decrease the wheel brake pressure applied to the wheels of the railcar. In other words, as the car body is loaded and the springs of the suspension deflect, the load weigh valve senses this spring deflection and communicates with the brake cylinders to increase the brake pressure applied to the wheels. Similarly, as the load placed on the car body decreases, the load weigh valve communicates with the brake cylinders to decrease the amount of pressure applied to the wheels.

The load weigh valve assembly 6 includes a load weigh valve 10 which is mounted to the railcar body 8 through the use of a mounting bracket 11. The load weigh valve interfaces with a top surface of the truck frame 14 through the use of a load weigh valve pivot arm 12 and an adjustable contact pin 13. At this interface, the contact pin 13, which is adjustably mounted to the load weigh valve pivot arm 12, reacts with the contact surface on the truck frame. In some assemblies, an adjusting block 16 is placed on the contact surface. In these assemblies, the contact pin 13 would then interface with a contact surface on the adjusting block 16. Because the springs of the suspension are located between the car body and truck frame, the car body is sprung relative to the truck frame. As a result, the conventional load weigh valve must compensate for any spring deflection in the suspension. The load weigh valve must also adjust for any truck swivel and car body roll.

Figure 2:
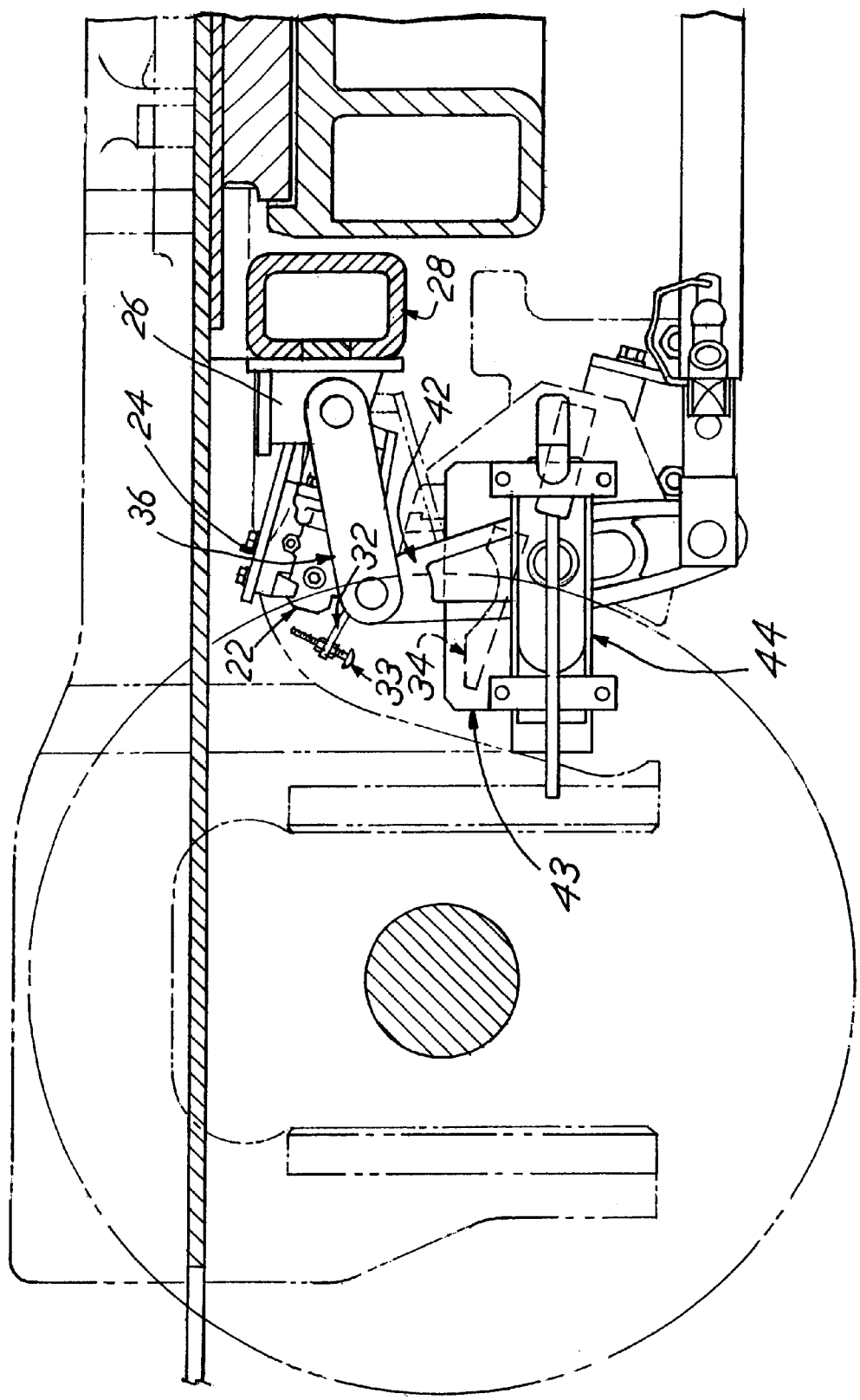
FIG. 2 shows a side view of a load weigh valve assembly of the present invention.
Figure 3:
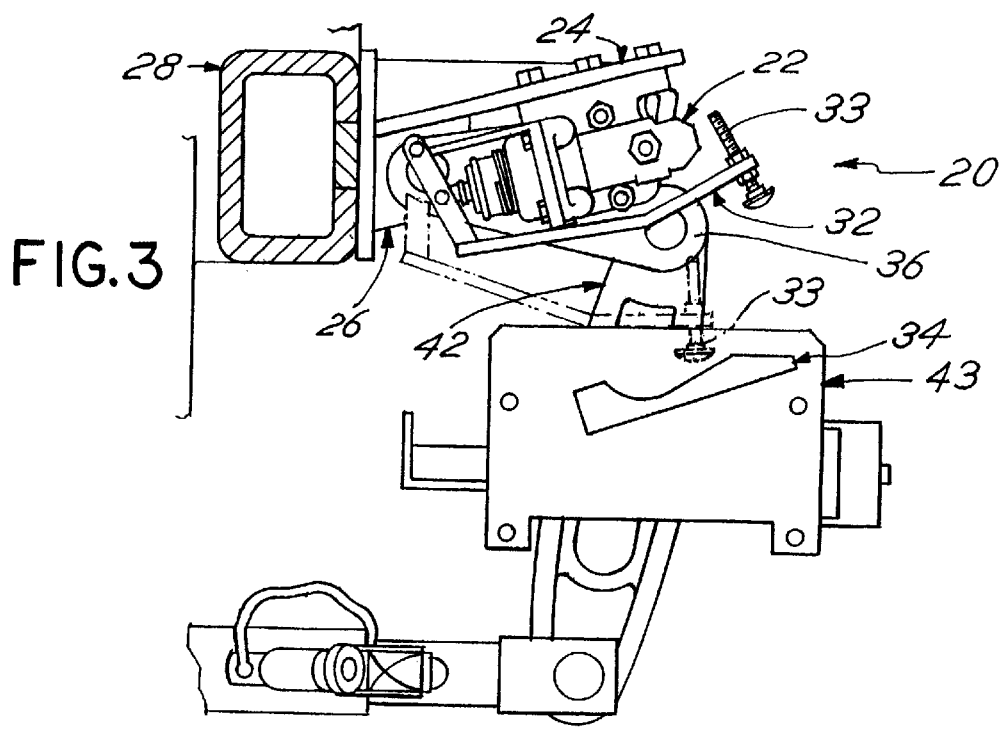
FIG. 3 shows a partial cross-section of a load weigh valve assembly of the present invention.
Figure 4:
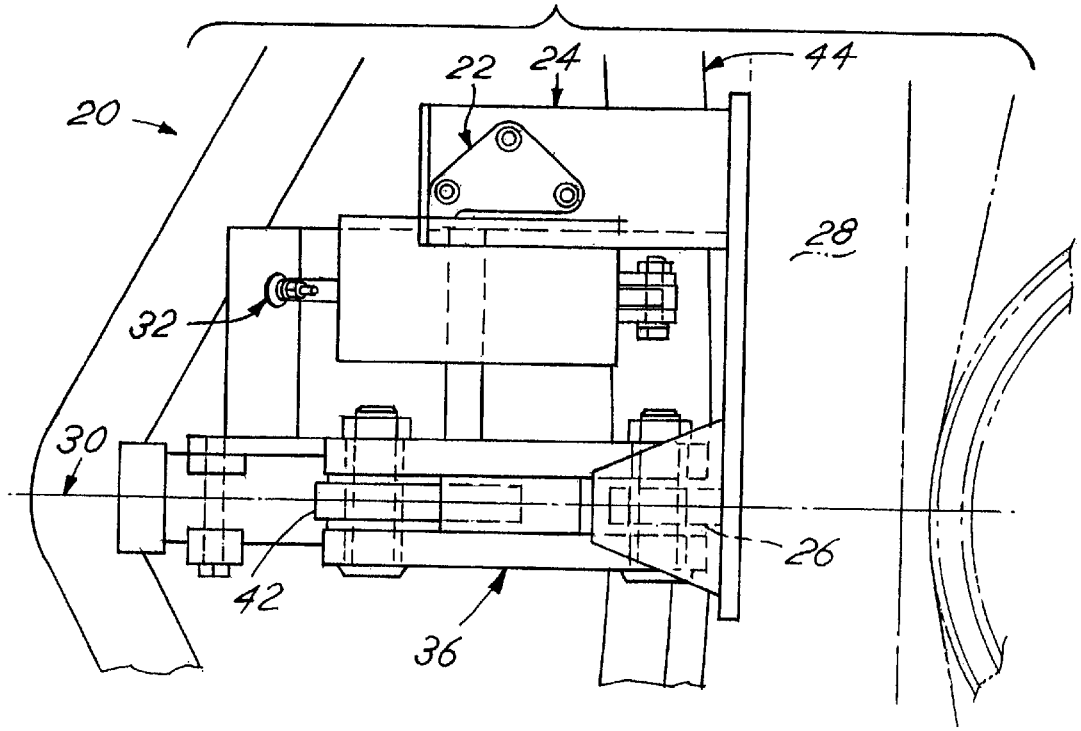
FIG. 4 shows a top view of the invention of FIG. 2.

Referring to FIGS. 2–4, there is depicted a load weigh valve assembly 20 of the present invention. It should be understood that the load weigh valve assembly 20 may be used with a railcar having a suspension between the car body and the truck frame, commonly found in freight car applications. It may also be used with a railcar having a suspension between the truck frame and the wheel and axle assembly. The load weigh valve assembly 20 includes a load weigh valve 22 which is mounted to a load weigh valve bracket 24 and a fulcrum bracket 26, which is attached to the truck frame 28 at or near centerline 30. Connected to the load weigh valve is a load weigh valve pivot arm 32 having an adjustable contact pin 33 mounted onto the end of the pivot arm. As depicted, load weigh valve 22 is mounted at an angle to ensure that pivot arm 32 is not damaged when it pivots to its maximum upward position. The load weigh valve assembly 20 includes a contoured contact plate 34. The contoured contact plate 34 contacts the pin 33 to actuate the load weigh valve pivot arm 32. The contoured contact plate 34 is attached to a load sensor arm interface bracket 43, which is attached to brake beam 44. A dead lever connecting link 36 is connected at one end to the fulcrum bracket 26, and at the other end to a brake beam dead lever 42.

Figure 8:
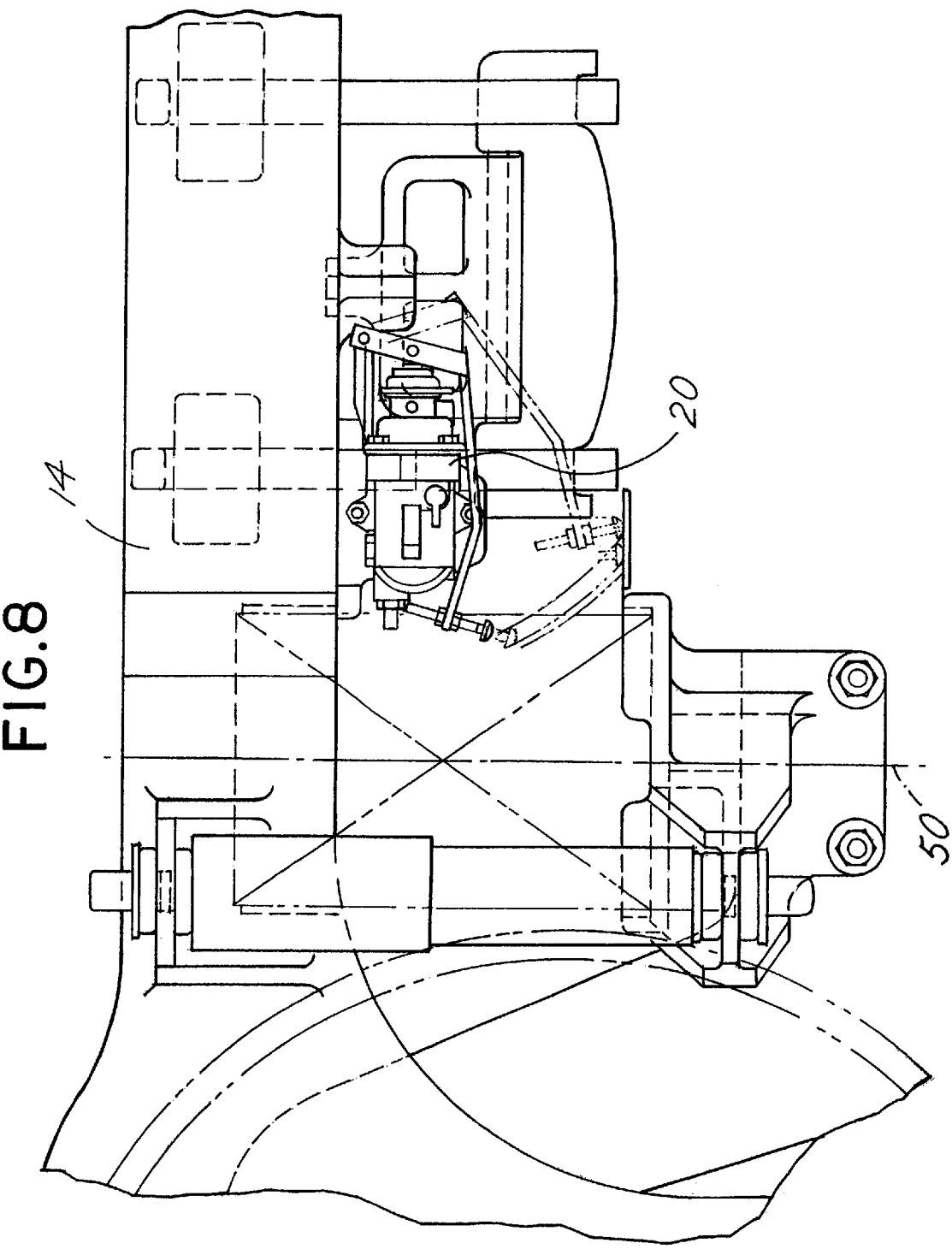
FIG. 8 shows a side view of an alternative mounting of the load weigh valve assembly of the present invention.
Figure 9:
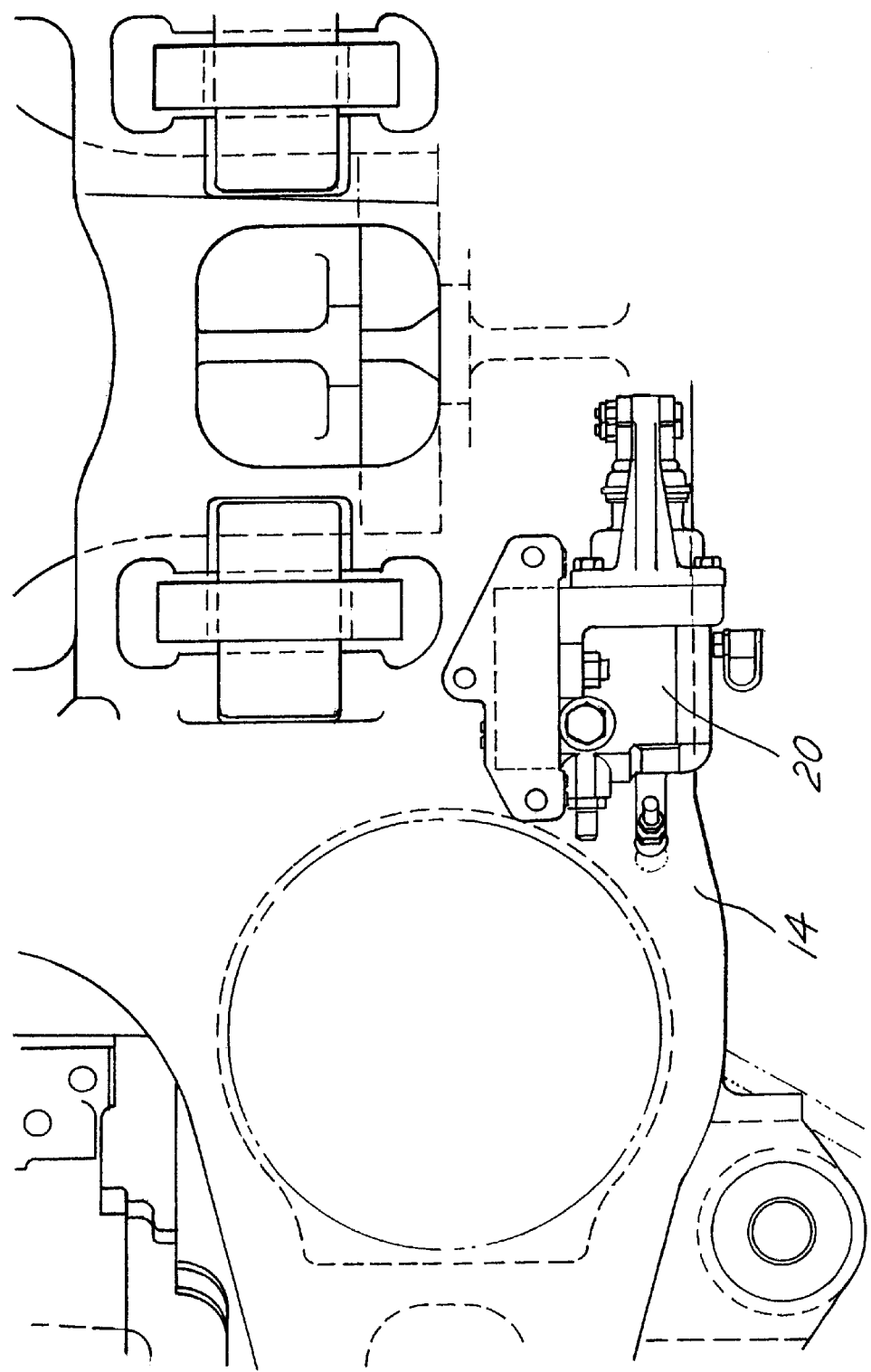
FIG. 9 shows a top plan view of the invention of FIG. 8.

Referring to FIGS. 8 and 9, an alternative method of mounting the load weigh valve assembly 20 is depicted. The load weigh valve assembly 20 is mounted near the side of the truck frame 14 in close proximity to the journal bearing centerline 50. This installation method can be used if the brake system does not use a dead lever connection on the truck frame transom. If this installation method is used, then carbody roll does affect the operation of the empty load valve. Like the load weigh valve mounted at or near the truck frame centerline, the side mounting arrangement eliminates the oscillating and sliding motion at the load weigh valve pivot arm, which often occurs with a standard freight truck during swivel. The side mounted valve construction allows a single assembly to maintain a relatively fixed changeover point from low pressure to high pressure. Moreover, brake component wear has no affect on the operation of the load weigh valve. The side mounted load weigh valve of the present invention can be applied on trucks having a suspension between the truck frame and the wheel and axle assembly.

Referring back to FIGS. 2–4, with the load weigh valve assembly of the present invention, when suspension spring deflection occurs as the railcar body is loaded, the truck frame mounted fulcrum bracket 26 moves vertically while the brake beam 44 and load sensor arm interface bracket 43 remain fixed. The vertical movement of fulcrum bracket 26 moves the load weigh valve pivot arm 32 and thus actuates load weigh valve 22.

Figure 5:
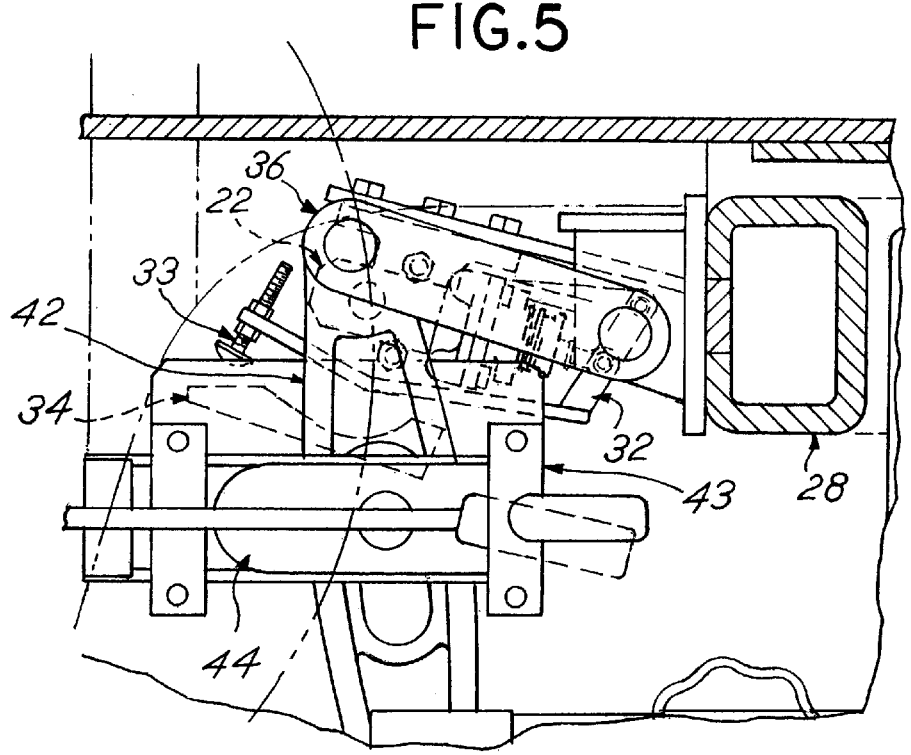
FIG. 5 shows a side view of a load weigh valve assembly of the present invention in a high pressure braking position.
Figure 6:
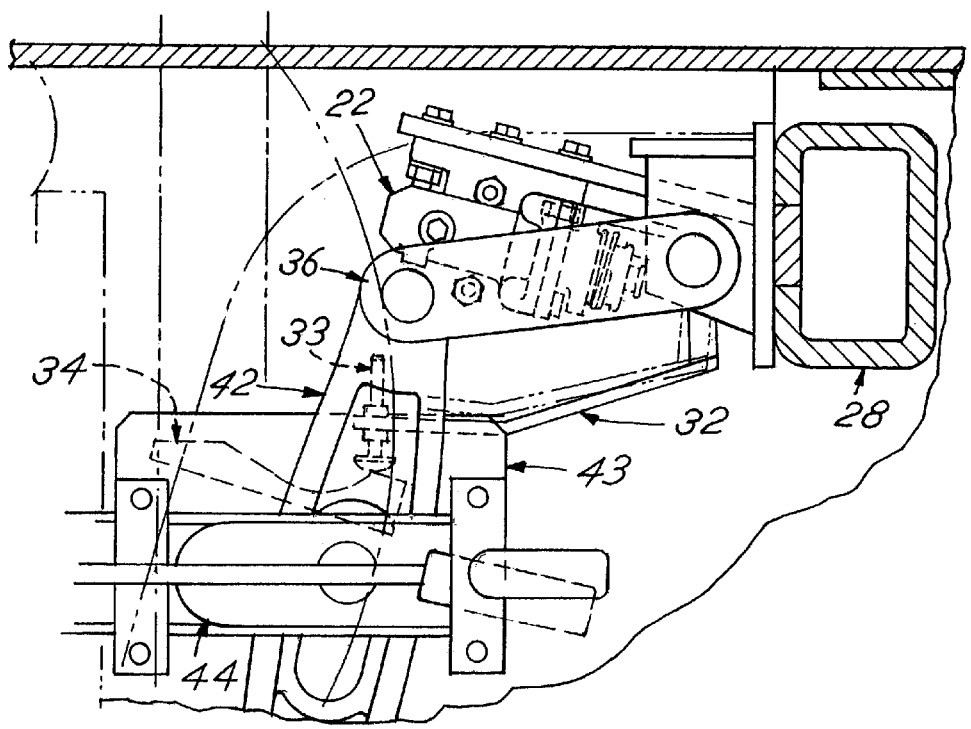
FIG. 6 shows a side view of a load weigh valve assembly of the present invention in a low pressure braking position.

Load weigh valve 22 typically communicates one of two pressure settings to the brake cylinders, a low pressure setting if the railcar is less than 40% loaded, and a high pressure setting if the railcar is over 40% loaded, although one skilled in the art will recognize that various settings can be employed. FIG. 5 shows load weigh valve 22 in a "solid spring" condition in which a fully loaded railcar results in the pivot arm 32 moving to the high pressure setting and actuating load weigh valve 22 to communicate a high pressure setting to the brake cylinders. FIG. 6 shows load weigh valve 22 in a condition in which a railcar is loaded less than 40% resulting in the pivot arm 32 moving to the low pressure setting and actuating load weigh valve 22 to communicate a low pressure setting to the brake cylinders.

Because the fulcrum bracket 26 moves vertically relative to the brake beam 44, parasitic changes in the vertical range of movement caused by the application of tread brakes and the different dimensions of new brake shoes and new wheels, and worn brake shoes and worn wheels vary the orientation of the pivot arm 32 relative to contact plate 34. This variation in the orientation of the pivot arm affects the changeover point between the high pressure and low pressure settings. To overcome this problem, contact plate 34 is contoured to allow the load weigh valve pivot arm 32 to remain in the proper orientation with the contact plate 34 between the new and worn component conditions when a constant load is applied to the suspension.

Figure 7:
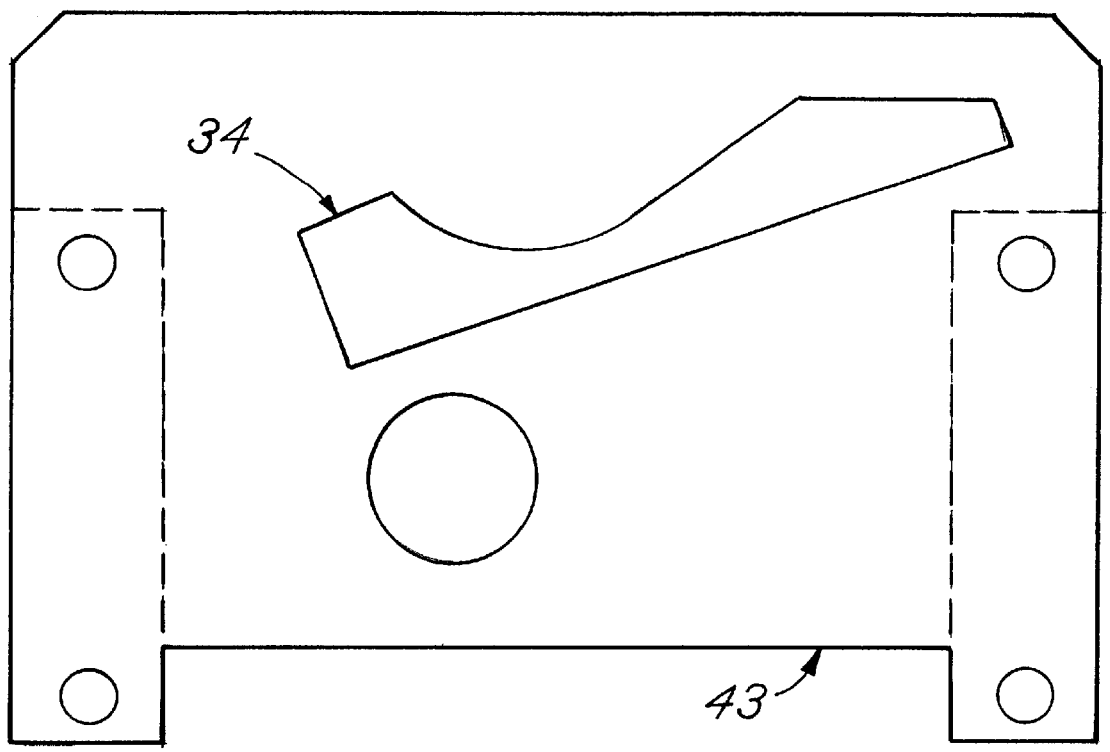
FIG. 7 shows a cross-section of a contact surface of the invention of FIG. 2.

FIG. 7 shows a side view of contact plate 34 attached to load sensor arm interface bracket 43. As stated, the contoured contact plate 34 allows the present invention to compensate for parasitic vertical movement caused by new and worn component conditions.

With the foregoing construction, the undesirable empty load valve actuation due to car body roll is essentially eliminated because the load weigh valve is located at or near the truck frame centerline 30. In addition, with the load weigh valve attached to the truck frame, the oscillating and sliding motion at the load weigh valve pivot arm, which often occurs with a standard freight truck during swivel, is eliminated. Furthermore, the foregoing construction allows a single assembly to maintain a relatively fixed changeover point from low pressure to high pressure braking irrespective of the application of tread brakes and differences between new and worn brake and wheel components.

The load weigh valve assembly of the present invention also eliminates the prior art car body mounting arrangement where the weigh valve is located on the underside of the car body floor above the truck frame. As noted, this arrangement is difficult to inspect because the car body sill obstructs most views of the valve. Also, the conventional arrangement makes valve replacement and maintenance very cumbersome and easy to overlook. Significantly, the load weigh valve assembly of the present invention can be applied on primary sprung trucks and is as rugged and reliable as the conventional load weigh valve assembly, while being easy to view from the end of the truck. Valve inspection and replacement with the present invention are also improved over the conventional arrangement. In addition, with the location of the load weigh valve at or near the truck centerline, the exposure of the load weigh valve to foreign matter and flying debris thrown up by the wheels during operation is minimized.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A railway car including a railway car body and railway car truck, the railway car truck having a pair of spaced wheel sets, each wheel set having a pair of transversely spaced wheels, the railway car truck comprising:
   a truck frame,
   a load weigh valve assembly mounted to the truck frame, the load weigh valve assembly further comprising a load weigh valve connected to the truck frame, a load weigh valve pivot arm operatively connected to the load weigh valve, the load weigh valve pivot arm operatively in contact with a contact surface which is mounted to a load sensor interface bracket,
   whereby the load weigh valve assembly provides a constant changeover point between a low pressure brake setting and a high pressure brake setting during railway car body roll.

2. The railway car of claim 1 further comprising a load weigh valve bracket mounted to the load weigh valve and the truck frame.

3. A railway car including a railway car body and railway car truck, the railway car truck having a pair of spaced wheel sets, each wheel set having a pair of transversely spaced wheels, the railway car truck comprising:
   a truck frame,
   a load weigh valve assembly mounted to the truck frame, the load weigh valve assembly further comprising a load weigh valve connected to the truck frame, a load weigh valve pivot arm operatively connected to the load weigh valve, the load weigh valve pivot arm operatively in contact with a contact surface which is mounted to a load sensor interface bracket, the contact surface is contoured to compensate for parasitic vertical movement of the load weigh valve pivot arm caused by worn components.

4. The railway car truck of claim 3 wherein the truck frame defines a centerline, the load weigh valve assembly is mounted on the truck frame near the centerline.

5. The railway car truck of claim 3 wherein the truck frame defines a side, the load weigh valve assembly is mounted on the truck frame near the side.

6. A railway car having a primary suspension, the railway car comprising:
   a truck frame,
   a load weigh valve assembly mounted to the truck frame, the load weigh valve assembly further comprising a load weigh valve connected to the truck frame, a weigh valve pivot arm operatively connected to the load weigh valve, a dead lever connecting link connected to the truck frame, a contoured contact plate attached to a load sensor arm interface bracket, the load sensor interface bracket connected to a brake beam,
   whereby the contoured contact plate compensates for parasitic vertical movement of the weigh valve pivot arm caused by worn components.

7. The railway car of claim 6 further comprising a load weigh valve bracket mounted to the load weigh valve.

8. The railway car of claim 7 further comprising a fulcrum bracket mounted to the load weigh valve bracket and the truck frame.

9. The railway car of claim 7 wherein the truck frame defines a centerline, the load weigh valve assembly is mounted on the truck frame near the centerline.

10. The railway car of claim 7 wherein the truck frame defines a side, the load weigh valve assembly is mounted on the truck frame near the side.

11. The railway car of claim 6 wherein the load sensor arm interface bracket is unsprung.

12. A railway car truck comprising:
    a truck frame,
    a load weigh valve assembly mounted to the truck frame, the load weigh valve assembly further comprising a load weigh valve connected to the truck frame, a weigh valve pivot arm operatively connected to the load weigh valve, a dead lever connecting link connected to the truck frame, a contoured contact plate attached to a load sensor arm interface bracket, the load sensor interface bracket is connected to a brake beam and a brake beam dead lever,
    whereby the load weigh valve assembly provides a constant changeover point between a low pressure brake setting and a high pressure brake setting during railway car truck swivel.

13. The railway car truck of claim 12 further comprising a load weigh valve bracket mounted to the load weigh valve.

14. The railway car truck of claim 13 further comprising a fulcrum bracket mounted to the load weigh valve bracket and the truck frame.

15. The railway car truck of claim 12 wherein the load sensor arm interface bracket is unsprung.

16. The railway car truck of claim 12 wherein the truck frame defines a centerline, the load weigh valve assembly is mounted on the truck frame near the centerline.

17. The railway car truck of claim 12 wherein the truck frame defines a side, the load weigh valve assembly is mounted on the truck frame near the side.

18. A railway car including a railway car body and railway car truck, the railway car truck having a pair of spaced wheel sets, each wheel set having a pair of transversely spaced wheels, the railway car truck comprising:
    a truck frame,
    a load weigh valve assembly mounted to the truck frame, the load weigh valve assembly further comprising a load weigh valve connected to the truck frame, a load weigh valve pivot arm operatively connected to the load weigh valve, the load weigh valve pivot arm operatively in contact with a contact surface which is mounted to a load sensor interface bracket, the load sensor arm interface bracket is mounted to a brake beam,
    whereby the load weigh valve assembly provides a constant changeover point between a low pressure brake setting and a high pressure brake setting during railway car body roll.

19. The railway car of claim 18 wherein the load sensor arm interface bracket is unsprung.

20. The railway car of claim 18 wherein the truck frame defines a centerline, the load weigh valve assembly is mounted on the truck frame near the centerline.

21. The railway car of claim 18 wherein the truck frame defines a side, the load weigh valve assembly is mounted on the truck frame near the side.

* * * * *